United States Patent
Yamamoto (10) Patent No.: US 9,285,564 B2
(45) Date of Patent: Mar. 15, 2016

(54) LENS FOR PROJECTION AND PROJECTION-TYPE DISPLAY APPARATUS

(71) Applicant: FUJIFILM Corporation, Tokyo (JP)

(72) Inventor: Chikara Yamamoto, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/515,727

(22) Filed: Oct. 16, 2014

(65) Prior Publication Data

US 2015/0036229 A1 Feb. 5, 2015

Related U.S. Application Data

(63) Continuation of application No. PCT/JP2013/002560, filed on Apr. 16, 2013.

(30) Foreign Application Priority Data

Apr. 19, 2012 (JP) .................................. 2012-095342

(51) Int. Cl.
*G02B 9/62* (2006.01)
*G02B 13/00* (2006.01)
*G02B 13/16* (2006.01)
(Continued)

(52) U.S. Cl.
CPC .............. *G02B 9/62* (2013.01); *G02B 13/0045* (2013.01); *G02B 13/16* (2013.01); *G02B 13/18* (2013.01); *G02B 27/1026* (2013.01); *H04N 9/317* (2013.01)

(58) Field of Classification Search
CPC ........ G02B 9/62; G02B 9/64; G02B 13/0045; G02B 13/18; G02B 13/22

USPC ......... 359/708, 713, 746, 749–752, 754–756, 359/761

See application file for complete search history.

(56) References Cited

U.S. PATENT DOCUMENTS

| 4,189,211 A * | 2/1980 | Taylor ................... G02B 13/00 359/663 |
| 6,124,978 A | 9/2000 | Yoneyama |

(Continued)

FOREIGN PATENT DOCUMENTS

| JP | 02-184809 | 7/1990 |
| JP | 09-145998 | 6/1997 |

(Continued)

OTHER PUBLICATIONS

International Search Report PCT/JP2013/002560 dated Aug. 20, 2013.

*Primary Examiner* — Darryl J Collins
(74) *Attorney, Agent, or Firm* — Young & Thompson

(57) ABSTRACT

A lens for projection substantially consists of a negative first lens with its concave surface facing a reduction side, a positive second lens with its concave surface facing the reduction side, a negative third lens with its concave surface facing a magnification side, a positive fourth lens with its convex surface facing the reduction side, a positive fifth lens and a positive sixth lens in this order from the magnification side. The reduction side is telecentric. The following conditional formulas (1) and (2) about refractive power P4 of a reduction-side surface of the second lens, refractive power P5 of a magnification-side surface of the third lens, and focal length f of an entire system are satisfied:

$$-3.0 \leq 1/(P4 \times f) \leq -0.4 \quad (1); \text{ and}$$

$$-2.0 \leq 1/(P5 \times f) \leq -0.2 \quad (2).$$

19 Claims, 7 Drawing Sheets

(51) Int. Cl.
*G02B 27/10* (2006.01)
*G02B 13/18* (2006.01)
*H04N 9/31* (2006.01)

(56) References Cited

U.S. PATENT DOCUMENTS

2012/0057249 A1  3/2012  Yamamoto

2013/0258491 A1 * 10/2013  Shiue .................. G02B 13/16
                                                    359/649

FOREIGN PATENT DOCUMENTS

| JP | 2000-039555 | 2/2000 |
| JP | 2000-321509 | 11/2000 |
| JP | 2002-341242 | 11/2002 |
| JP | 2012-058315 | 3/2012 |

* cited by examiner

FIG.1

EXAMPLE 1

EXAMPLE 1

FIG.7

EXAMPLE 2

LENS FOR PROJECTION AND PROJECTION-TYPE DISPLAY APPARATUS

CROSS-REFERENCE TO RELATED APPLICATIONS

This application is a Continuation of PCT International Application No. PCT/JP2013/002560 filed on Apr. 16, 2013, which claims priority under 35 U.S.C. §119 (a) to Japanese Patent Application No. 2012-095342 filed on Apr. 19, 2012. Each of the above applications is hereby expressly incorporated by reference, in its entirety, into the present application.

BACKGROUND OF THE INVENTION

1. Field of the Invention

The present invention relates to a lens for projection and a projection-type display apparatus. For example, the present invention relates to a lens for projection appropriately usable to magnify and project rays including video image information from a light valve onto a screen, and also so a projection-type display apparatus using the lens for projection.

2. Description of the Related Art

In recent years, a market for projection-type display apparatuses greatly expanded as personal computers became widely used. As a light valve for performing light modulation, a transmission-type or reflection-type liquid crystal display device, a DMD (Digital Micromirror Device: registered trademark), in which micromirrors are regularly arranged, and the like are known projection-type display apparatus using such a light valve needs to have excellent convenient characteristics and installation characteristics, small size and light weight, and a small F-number. Therefore, a lens for projection to be mounted on the projection-type display apparatus also needs to have a wide angle of view, small size and light weight, and to have a small F-number, and to be at low cost, and to consist of a small number of lenses.

In a projection-type display apparatus using light valves, a lens for projection needs a sufficient length of back focus to arrange, toward a reduction side of the lens for projection, a color combination member for combining modulated light, which has been modulated by a different light valve for each color, a separation member for separating projection light and illumination light from each other, and the like. As a lens for projection consisting of a small number of lenses and having a relatively long back focus, lenses for projection disclosed, for example, in Japanese Unexamined Patent Publication No. 9(1997)-145998 (Patent Document 1), Japanese Unexamined Patent Publication No. 2 (1990)-184809 (Patent Document 2), Japanese Unexamined Patent Publication NO. 2000-039555 (Patent Document 3) and Japanese Unexamined Patent Publication No. 2002-341242 (Patent Document 4) are known. Patent Document 1 discloses a lens system consisting of six lenses of a positive lens, a positive lens, a negative lens, a negative lens, a positive lens and a positive lens arranged in this order from a magnification side. Each of Patent Documents 2 and 3 discloses a lens system consisting of six lenses of a positive lens, a negative lens, a negative lens, a positive lens, a positive lens and a positive lens arranged in this order from a magnification side. Patent Document 4 discloses, as Example 8, a lens system consisting of six lenses of a positive lens, a negative lens, a positive lens, a negative lens, a positive lens and a positive lens arranged in this order from a magnification side.

SUMMARY OF THE INVENTION

However, each of the lens systems disclosed in Patent Documents 1 and 2, and which consists of six lenses, has an F-number of 4.0, which is large. Further, full angles of view are in the range of 22 degrees to 34 degrees, and the lens systems do not cope with a request to achieve a wider angle of view. Patent Document 3 discloses a lens system with an F-number of 1.7, which is small. However, a full angle of view is 32 degrees, and the lens system does not cope with a request to achieve a wider angle of view. In Example 8 of Patent Document 4, an F-number is 2.1, and a full angle of view is about 60 degrees. However, the total length of the lens system is long, and correction of distortion and a lateral chromatic aberration is insufficient.

In view of the foregoing circumstances, it is an object of the present invention to provide a lens for projection with a small F-number, a wide angle of view and high performance, in which various aberrations are excellently corrected in a well-balanced manner, and which has small size and light weight, while the number of lenses constituting the lens for projection is six, which is small, and a projection-type display apparatus using the lens for projection.

A lens for projection of the present invention substantially consists of six lenses of a first lens having negative refractive power with its concave surface facing a reduction side, a second lens having positive refractive power with its concave surface facing the reduction side, a third lens having negative refractive power with its concave surface facing a magnification side, a fourth lens having positive refractive power with its convex surface facing; the reduction side, a fifth lens having positive refractive power and a sixth lens having positive refractive power in this order from the magnification side. Further, the reduction side is telecentric, and the following conditional formulas (1) and (2) are satisfied:

$$-3.0 \leq 1/(P4 \times f) \leq -0.4 \quad (1) \text{ and}$$

$$-2.0 \leq 1/(P5 \times f) \leq -0.2 \quad (2), \text{ where}$$

P4: refractive power of a reduction-side surface of the second lens,

P5: refractive power of a magnification-side surface of the third lens, and f: a focal length of an entire system.

In the lens for projection of the present invention, it is desirable that at least one of the following conditional formulas (1') and (2') is satisfied:

$$-2.5 \leq 1/(P4 \times f) \leq 0.6 \quad (1'); \text{ and}$$

$$-1.5 \leq 1/(P5 \times f) \leq -0.3 \quad (2')$$

In the lens for projection of the present invention, it is desirable that the following conditional formula (3) is satisfied. Further, it is more desirable that the following conditional formula (3') is satisfied:

$$0.5 \leq Bf/f \leq 2.0 \quad (3); \text{ and}$$

$$0.5 \leq Bf/f \leq 1.5 \quad (3'), \text{ where}$$

Bf: a back focus of the entire system (a distance in air).

In the lens for protection of the present invention, it is desirable that the following conditional formula (4) is satisfied. Further, it is more desirable that the following conditional formula (4') is satisfied:

$$1.0 \leq D/f \leq 3.5 \quad (4); \text{ and}$$

$$1.5 \leq D/f \leq 3.0 \quad (4'), \text{ where}$$

D: a distance on an optical axis from a magnification-side lens surface of the first lens to a reduction-side lens surface of the sixth lens.

In the lens for protection of the present invention, it is desirable that the following conditional formula (5) is satisfied. Further, it is more desirable that the following conditional formula (5') is satisfied:

$$0.2 \leq R3/R4 \leq 0.9 \quad (5); \text{ and}$$

$$0.3 \leq R3/R4 \leq 0.9 \quad (5'), \text{ where}$$

R3: a curvature radius of a magnification-side surface of the second lens, and

R4: a curvature radius of a reduction-side surface of the second lens.

In the lens for projection of the present invention, it is desirable that the following conditional formula (6) is satisfied. Further, it is more desirable that the following conditional formula (6') is satisfied:

$$1.0 \leq f2/f \leq 2.5 \quad (6); \text{ and}$$

$$1.1 \leq f2/f \leq 2.0 \quad (6'), \text{ where}$$

where f2: a focal length of the second lens.

In the lens for projection of the present invention, it is desirable that the third lens and the fourth lens are cemented together.

In the lens for projection of the present invention, it is desirable that the following conditional formula (7) is satisfied:

$$vd2 \leq 30 \quad (7), \text{ where}$$

vd2: an Abbe number of the second lens for d-line,

In the lens for projection of the present invention, it is desirable that at least one of lens surfaces included in the first lens and the sixth lens is aspherical.

A projection-type display apparatus of the present invention includes a light source, a light valve on which light from this light source is incident, and the aforementioned lens for projection of the present invention, as a lens for projection that projects an optical image of light that has been optically modulated by the light valve onto a screen.

Here, the term "magnification side" means a projected side (a screen side). The screen side will be referred to as the magnification side also in reduction projection for the sake of convenience. On the other hand, the term "reduction side" means an original image display area side (a light valve side). The light valve side will be referred to as the reduction side also in reduction projection for the sake of convenience.

The surface shape, refractive power and curvature radius of a lens are considered in a paraxial region when the lens includes an aspherical surface.

Here, the expression "substantially consisting of . . . " means that lenses substantially without any refractive power, optical elements other than lenses, such as a stop, a mask, a cover glass and a filter, a mechanism part, such as a lens flange, a lens barrel and a hand shake blur correction mechanism, and the like may be included in addition to the six lenses mentioned as composition elements.

The expression "a reduction side is telecentric" represents a state in which a bisector of an angle between the maximum ray on the upper side and the maximum, ray on the lower side in a cross section of rays converging at an arbitrary point on a reduction-side image plane is nearly parallel so an optical axis. The expression does not mean only a perfect telecentric case, i.e., a case in which the bisector of the angle is perfectly parallel to the optical axis. The expression also means a case with some error (a case in which the bisector is slightly inclined with respect to the optical axis). Here, the case with some error (a casein which the bisector is slightly inclined with respect to the optical axis) means that the inclination of the bisector of the angle with respect to the optical axis is within the range of ±4°.

Further, "refractive power of a surface" is represented by (n2-n1)/r when the curvature radius of the surface is r, and the refractive index of a medium on the magnification side of this surface and the refractive index of a medium on the reduction side of this surface are n1 and n2, respectively.

The "back focus" is a length on an optical axis from a most reduction-side lens surface to a reduction-side paraxial focal plane. Here, the magnification side and the reduction side are regarded as the from side and the back side, respectively.

In the specification of the present invention, the sign of a curvature radius is positive when a surface shape is convex toward the magnification side, and negative when a surface shape is convex toward the reduction side.

In the lens for projection of the present invention, power arrangement is appropriately set by arranging a negative lens, a positive lens, a negative lens, a positive lens, a positive lens and a positive lens in this order from the magnification side, and the shape of the first lens through the fourth lens is appropriately set. Further, the lens for projection is structured to satisfy conditional formulas (1) and (2). Therefore, a lens for projection with a small F-number, a wide angle of view and high performance, in which various aberrations are excellently corrected in a well-balanced manner, and which has small size and light weight, is achievable while the number of lenses constituting the lens for projection is six, which is small.

The projection-type display apparatus of the present invention uses the lens for projection of the present invention. Therefore, the projection-type display apparatus has a small F-number, a wide angle of view and high performance, and is structurable in small size and light weight.

DESCRIPTION OF THE PREFERRED EMBODIMENTS

Figure 1:
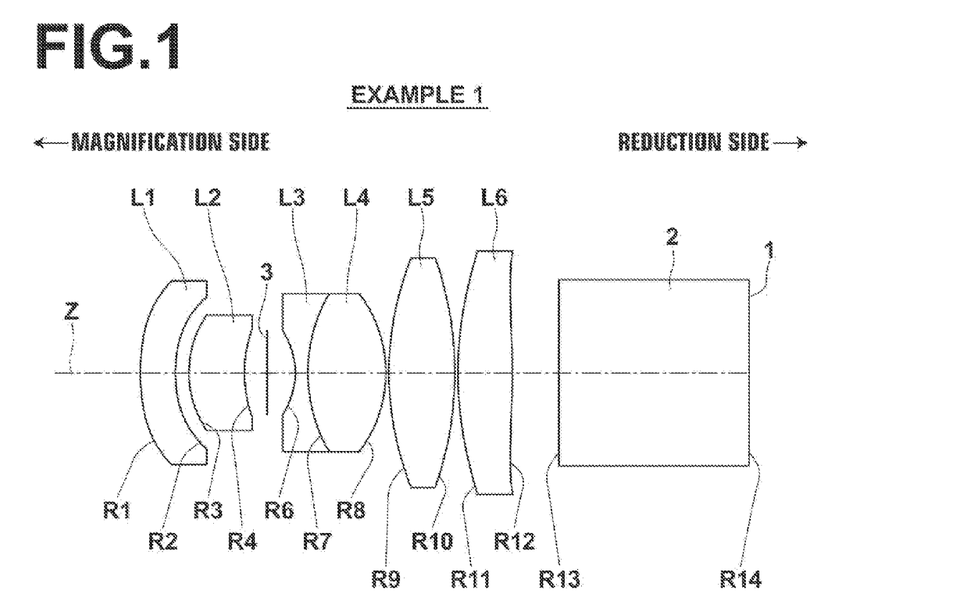
FIG. 1 is a cross section illustrating the lens structure of a lens for projection in Example 1 of the present invention.

Hereinafter, embodiments of the present invention will be described in detail with reference to drawings. FIG. 1 is a cross section at a sectional plane including optical axis Z of a lens for projection according to an embodiment of the present invention. A structure example illustrated in FIG. 1 corresponds to a lens for projection in Example 1, which will be described later signs R1 through R14 in FIG. 1 will be described later in the explanation of examples.

This lens for projection consists of six lenses of first lens L1 through sixth lens L6. This lens for projection may be mounted, for example, on a projection-type display apparatus, and is usable, as a lens for projection that projects image information displayed on a light valve onto a screen. In FIG. 1, a left side of the diagram is a magnification side, and a right side of the diagram is a reduction side. A case of mounting the lens for projection on a projection-type display apparatus is assumed, and a parallel-flat-plate-shaped optical member 2, which is assumed to be various filters, a cover glass or the like, and an image display surface 1 of the light valve are also illustrated.

FIG. 1 illustrates an example in which the position of the reduction-side surface of the optical member 2 and the position of the image display surface 1 coincide with each other. However, the present invention is not necessarily limited to this example. Further, FIG. 1 illustrates only one image display surface 1. Alternatively, the projection-type display apparatus may be structured so that a full color image is displayable by separating rays from a light source into three primary colors by a color separation optical system, and by providing three light valves for respective primary colors.

In the projection-type display apparatus, rays to which image information has been given at the image display surface 1 enter the lens for projection through the optical member 2. Further, the rays are projected, by the lens for projection, onto a screen (not illustrated) arranged in the left-side direction of the paper surface.

A lens for projection according to an embodiment of the present invention consists of six lenses of first lens L1 having negative refractive power with its concave surface facing a reduction side, second lens 102 having positive refractive power with its con cave surface facing the reduction side, third lens L1 having negative refractive power with its concave surface facing a magnification side, fourth lens L4 having positive refractive power with its convex surface facing the reduction side, fifth lens L5 having positive refractive power, and sixth lens 106 having positive refractive power, in this order from the magnification side. Further, the lens for projection is structured so that the reduction side is telecentric Since first lens L1, which is the most magnification-side lens, is a negative lens and three positive lenses are arranged from the reduction side of the lens for projection, the lens for projection is a retro-focus-type optical system. Therefore, it is possible to secure a long back focus while the angle of view is widened. Further, the reduction-side surface of first lens L1 is a concave surface, and that is advantageous to widening the angle of view.

Both of the reduction-side surface of second lens L2 and the magnification-side surface of third lens L3 are concave surfaces, and they face each other. That is advantageous to achievement of an optical system with a small F-number in which curvature of field and a spherical aberration are excellently corrected.

In the lens for projection in the example illustrated in FIG. 1, a stop 3 is arranged between second lens L2 and third lens L3. The arrangement of the stop 3 at this position is advantageous to achievement of an optical system in small size and with a small F-number while excellent telecentricity is secured. Here, the stop 3 may be a stop with a fixed aperture diameter, or a variable stop with a variable aperture diameter.

The reduction-side surface of fourth lens L4 is a convex surface, and three lenses of the first through third lenses from the reduction side (lenses L4, L5 and L6) are positive lenses. Therefore, it is possible to achieve an optical system with a small F-number in which various aberrations are excellently corrected while telecentricity is secured in the lens system consisting of a small, number of lenses.

More specifically, for example, in the lens for projection in the example illustrated in FIG. 1, six lenses of first lens L1 in negative meniscus shape with its concave surface facing the reduction side in a paraxial region, second lens L2, which is a positive meniscus lens with its concave surface facing the reduction side, third lens L3, which is a biconcave lens, fourth lens L4, which is a biconvex lens, fifth lens L5, which is a biconvex lens, and sixth lens L6 in biconvex shape in a paraxial region are arranged in this order from the magnification side.

It is desirable that third lens L3 and fourth lens L4 are cemented together as in the example illustrated in FIG. 1. When a cemented lens is arranged almost in the middle of the lens system, it is possible to excellently correct chromatic aberrations, especially, a longitudinal chromatic aberration.

Further, it is desirable that at least one of lens surfaces included in first lens L1 and sixth lens L6 is aspherical. That is because a ray height is high at the most magnification-side lens and at the most reduction-side lens, and axial rays and off-axial rays have been separated. When an aspherical surface or surfaces are applied to the surface or surfaces, effective correction of aberrations is possible. Further, that is advantageous to achievement of an optical system with a small F-number, a wide angle of view and high performance.

The lens for projection according to the embodiment of the present invention is structured to satisfy the following conditional formulas (1) and (2):

$$-3.0 \leq 1/(P4 \times f) \leq -0.4 \quad (1);$$

$$-2.0 \leq 1/(P5 \times f) \leq -0.2 \quad (2),$$ where

P4: refractive power of a reduction-side surface of the second lens,

P5: refractive power of a magnification-side surface of the third lens, and f: a focal length of an entire system.

When conditional formulas (1) and (2) are satisfied at the same time, it is possible to appropriately set the refractive power of two concave surfaces facing together, namely, the reduction-side surface of second lens L2, which is a concave surface, and the magnification-side surface of third lens L3, which is a concave surface.

If the value is lower than the lower limit of conditional formula (1), the refractive power of the reduction-side surface of second lens L2 becomes weak. If high performance is tried to be maintained while the refractive power of the reduction-side surface of second lens L2 is weak, the length of the entire lens system, especially, a length in the direction of the optical axis becomes long. If the value exceeds the upper limit of conditional formula (1), excellent correction of aberrations, especially, correction of curvature of field becomes difficult.

Therefore, it is more desirable that the following conditional formula (1') is satisfied instead of conditional formula (1) to further reduce the size and to correct aberrations in a more excellent manner:

$$-2.5 \leq 1/(P4 \times f) \leq -0.6 \quad (1'),$$

If the value is lower than the lower limit of conditional formula (2), the refractive power of the magnification-side surface of third lens L3 becomes weak. If high performance is tried to be maintained while the refractive power of the magnification-side surface of third lens L1 is weak, the length of the entire lens system, especially, a length in the direction of the optical axis becomes long. If the value exceeds the upper limit of conditional formula (2), excellent correction of aberrations, especially, correction of curvature of field becomes difficult.

Therefore, it is more desirable that the following conditional formula (2') is satisfied instead of conditional formula (2) to further reduce the size and to correct aberrations in a more excellent manner:

$$-1.5 \leq 1/(P5 \times f) \leq -0.3 \tag{2'}$$

Further, it is desirable that the lens for projection according to the embodiment of the present invention satisfies any one or an arbitrary combination of the following conditional formulas (3) through (7) in addition to conditional formulas (1) and (2):

$$0.5 \leq Bf/f \leq 2.0 \tag{3}$$

$$1.0 \leq D/f \leq 3.5 \tag{4}$$

$$0.2 \leq R3/R4 \leq 0.9 \tag{5}$$

$$1.0 \leq f2/f \leq 2.5 \tag{6; and}$$

$$vd2 \leq 30 \tag{7), where}$$

Bf: a back focus of the entire system (a distance in air),
f: a focal length of she entire system,
D: a distance on an optical axis from a magnification-side lens surface of the first lens to a reduction-side lens surface of the sixth lens.
R3: a curvature radius of a magnification-side surface of the second lens,
R4: a curvature radius: of a reduction-side surface of the second lens,
f2: a focal length of the second lens, and
vd2: an Abbe number of the second lens for d-line.

Conditional formula (3) is a formula about a back focus. If the value is lower than the lower limit of conditional formula (3), it becomes difficult to arrange a color combination member, a separation member and the like toward the reduction side of the lens for projection. If the value exceeds the upper limit of conditional formula (3), the diameter or diameters of a lens or lenses located toward the reduction side become large, and the length of the lens system in the direction of the optical axis becomes long. Therefore, the size of the entire lens system becomes large.

Therefore, it is more desirable that the following conditional formula (3') is satisfied instead of conditional formula (3) to further reduce the size of the lens system:

$$0.5 \leq Bf/f \leq 1.5 \tag{3'}$$

Conditional formula (4) is a formula about the total thickness of the lens system. If the value is lower than the lower limit of conditional formula (4) excel lent correction of aberrations, especially, correction of curvature of field becomes difficult. If the value exceeds the upper limit of conditional formula (4), the length of the lens system, in the direction of the optical axis becomes long, and the size of the entire lens system, becomes large.

Therefore, it is more desirable that the following conditional formula (4') is satisfied instead of conditional formula (4) to further reduce the size of the lens system, and to more excellently correct aberrations:

$$1.5 \leq D/f \leq 3.0 \tag{4'}$$

Conditional formula (5) is a formula about a balance between the refractive power of the magnification-side surface of second lens L2 and the refractive power of the reduction-side surface of second lens L2. If the value is lower than the lower limit of conditional formula (5), or if the value exceeds the upper limit of conditional formula (5), it becomes difficult to excellently correct curvature of field, and to structure the whole lens system, in compact manner.

Therefore, it is more desirable that the following conditional formula (5') is satisfied instead of conditional formula (5) to further reduce size, and to more excellently correct aberrations:

$$0.3 \leq R3/R4 \leq 0.9 \tag{5'}$$

Conditional formula (6) is a formula about a ratio of the refractive power of second lens L2 to the refractive power of the entire system. If the value is lower than the lower limit of conditional formula (6), it becomes difficult to excellently correct a spherical aberration, and to secure a back focus. If the value exceeds the upper limit of conditional formula (6), the diameters of first lens L1, second lens L2 and the like, which are located toward the magnification side, become large, and that contradicts reduction in size and weight.

Therefore, it is more desirable that the following conditional formula (6') is satisfied instead of conditional formula (6) to more excellently correct aberrations, and to further reduce size and weight:

$$1.1 \leq f2/f \leq 2.0 \tag{6'}$$

Conditional formula (7) is a formula about dispersion properties of the material, of second lens L2. If the value exceeds the upper limit of conditional formula (7), excellent correction of chromatic aberrations becomes difficult.

Further, it is desirable that the aforementioned desirable structures are appropriately and optionally adopted based on what is requested about the lens for projection.

The lens for projection according to the embodiment of the present invention can achieve a small F-number (for example, an F-number smaller than 1.8) and a wide angle of view (for example, a wide angle with a full angle of view of 40° or higher) as requested in recent years and high performance while the lens for projection is structured in small size and light weight by using six lenses, which are a small number of lenses. Therefore, the lens for projection is appropriately usable, for example, in a palm-sized projection-type display apparatus.

Figure 2:
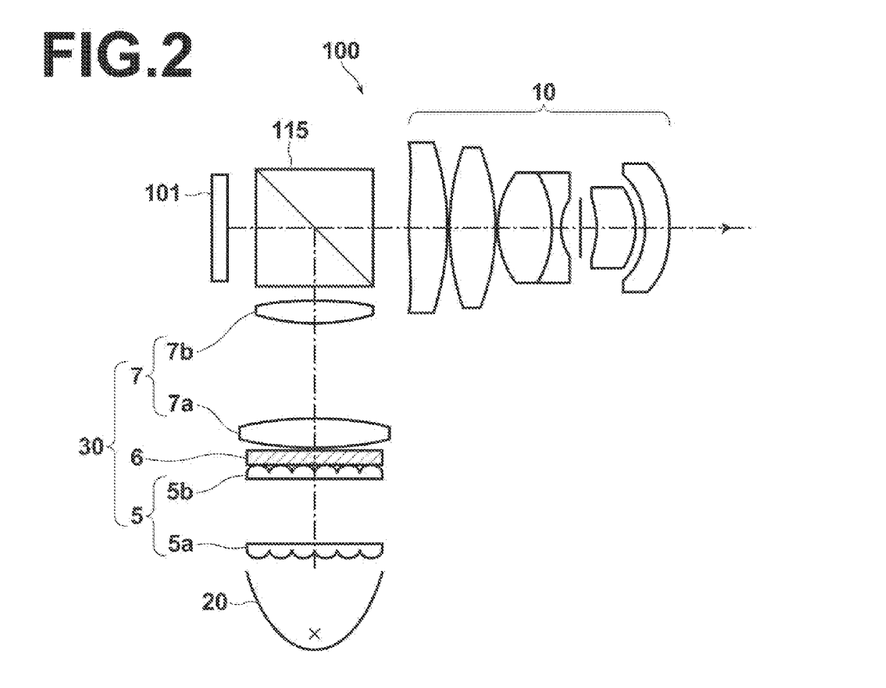
FIG. 2 is a schematic diagram, illustrating the structure of a projection-type display apparatus according to an embodiment of the present invention.
Figure 3:
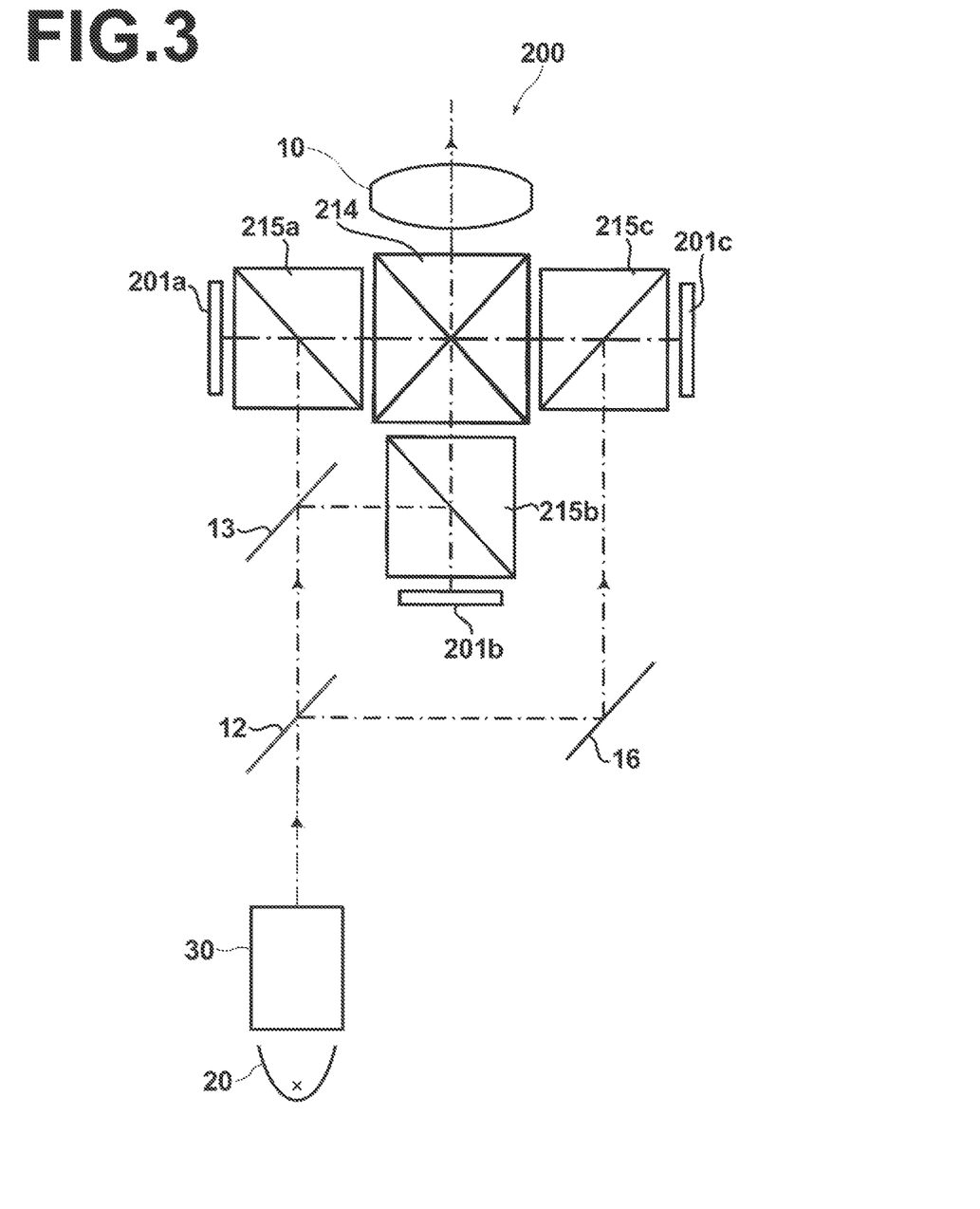
FIG. 3 is a schematic diagram illustrating the structure of a projection-type display apparatus according to an embodiment of the present invention.
Figure 4:
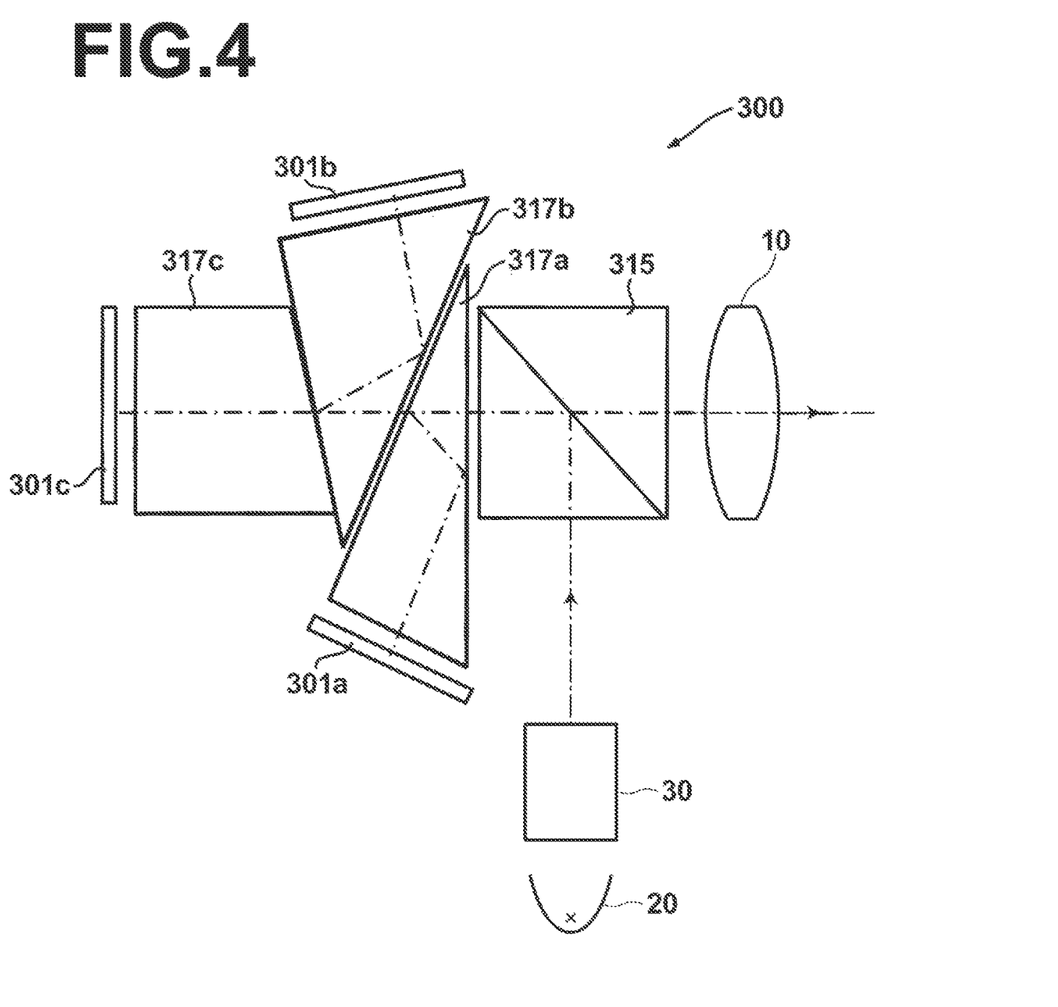
FIG. 4 is a schematic diagram illustrating the structure of a projection-type display apparatus according to an embodiment of the present invention.
Figure 5:
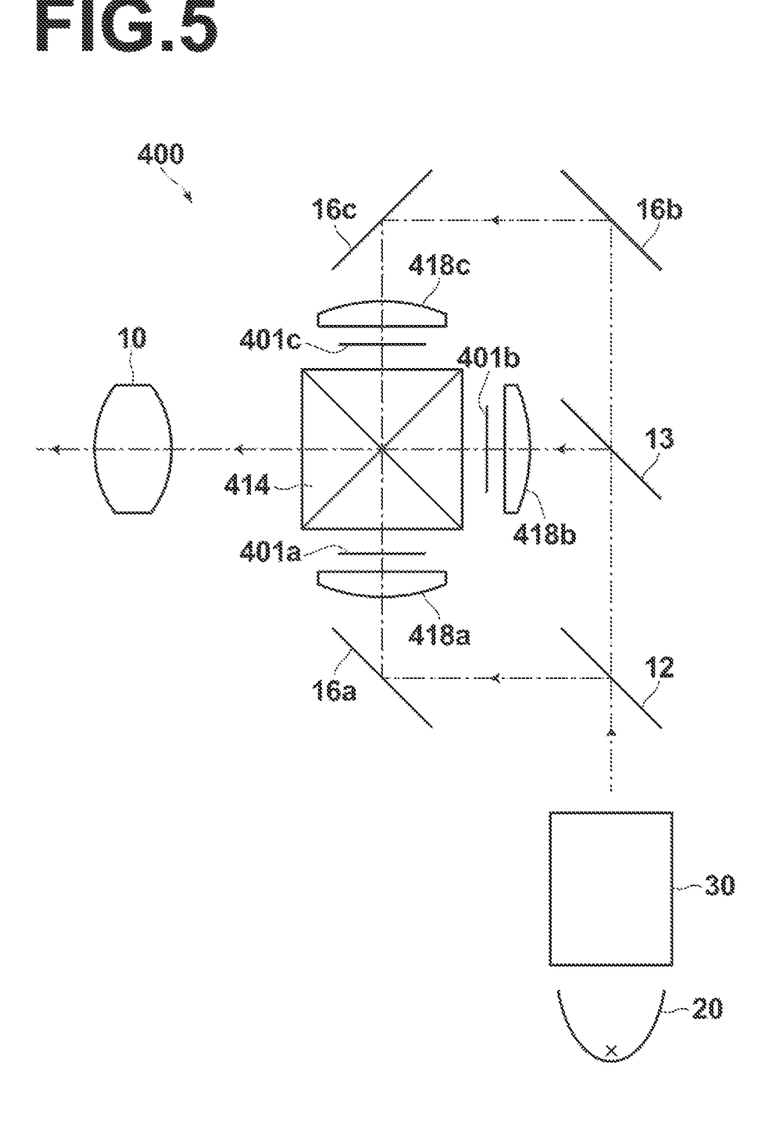
FIG. 5 is a schematic diagram, illustrating the structure of a projection-type display apparatus according to an embodiment of the present invention.

Next, with reference to FIG. 2 through FIG. 5, projection-type display according to embodiments of the present invention will be described. FIG. 2 illustrates an example of a projection-type display apparatus using a single sensor in which modulation is performed by a single light valve. FIG. 3 through FIG. 5 illustrate examples of projection-type display apparatuses using a three sensor method, in which modulation is performed for each light of R light, G light and B light by three light valves.

FIG. 2 is a schematic diagram, illustrating the structure of a projection-type display apparatus 100 according to an embodiment of the present invention. The projection-type display apparatus 100 includes a light source 20, an illumination optical unit 30, a reflection-type liquid crystal display device 101, as a lightwave, a polarized light separation prism 115, and a lens 10 for projection according to an embodiment of the present invention.

The illumination optical unit 30 includes a fly-eye integrator 5 consisting fly-eye lenses 5a, 5b, and which is provided to make illumination light uniform, a polarized light conversion element 6 that changes one of the directions of two linear polarizations, the oscillation planes of which are orthogonal to each other, so that the directions become the same, and outputs light, and a condensing lens 7 consisting of lenses 7a and 7b.

After light from the light source 20 travels through the fly-eye integrator 5, the light enters the polarized light conversion element 6. The oscillation planes of light are converted into a linear polarized light in a predetermined direction (P polarized light or S polarized light) by the polarized light conversion element 6. After then, the light is collimated by the condensing lens 7, and enters the polarized light separation prism 115. After the light is reflected by a reflection surface in the polarized light separation prism 115, the light enters the reflection-type liquid crystal display device 101, and optically modulated. After the light is transmitted through the polarized light separation prism 115, the light enters the lens 10 for projection. The lens 10 for projection projects an optical image of light that has been optically modulated by the reflection-type liquid crystal device 101 onto a screen, which is not illustrated.

In FIG. 2, the structure example illustrated in FIG. 1 is used as the lens 10 for projection. However, other structure examples may be used as long as the lens for projection according to an embodiment of the present invention is used. Further, the lenses for projection used in projection-type display apparatuses 200 through 400 according to the embodiments, which will be described later, are not limited to the structure example illustrated in FIG. 1, and other structure examples may be used as long as the lens for projection according to an embodiment of the present invention is used.

FIG. 3 is a schematic diagram illustrating the structure of a projection-type display apparatus 200 according to another embodiment of the present invention. The projection-type display apparatus 200 includes a light source 20, an illumination optical unit 30, reflection-type liquid crystal display devices 201a through 201c, as light valves corresponding to light, of respective colors, dichroic mirrors 12 and 13 for color separation, a cross-dichroic prism 214 for polarized light separation prisms 215a through 215c, a total reflection mirror 16 for deflecting an optical path, and a lens 10 for according to an embodiment of the present invention. In FIG. 3, the illumination optical unit 30 and the lens 10 for projection are schematically illustrated.

In the projection-type display apparatus 200, white light from the light source 20 is transmitted through the illumination optical unit 30. After then, the white light is separated into rays of three colors (G light, B light and R light) by the dichroic mirrors 12 and 13. The separated rays of colors enter the reflection-type liquid crystal display devices 201a through 201c corresponding to the rays of colors through the polarized light separation prisms 215a through 215c, respectively, and are optically modulated. After colors are combined by the cross-dichroic prism 214, light enters the lens 10 for projection. The lens 10 for projection projects an optical image of light that has been optically modulated by the reflection-type liquid crystal devices 201a through 201c onto a screen, which is not illustrated.

FIG. 4 is a schematic diagram illustrating the structure of a projection-type display apparatus 300 according to still another embodiment of the present invention. The projection-type display apparatus 300 includes a light source 20, an illumination optical unit 30, DMD elements 301a through 301c, as light valves corresponding to light of respective colors, TIR (Total Internal Reflection) prisms 317a through 317c for color separation and color combination, a TIR prism 315 for separating illumination light and projection light from each other, and a lens 10 for projection according to an embodiment of the present invention. In FIG. 4, the illumination optical unit 30 and the lens 10 for projection are schematically illustrated.

In the projection-type display apparatus 300, white light from the light source 20 is transmitted through the illumination optical unit 30. After the white light is reflected by a reflection surface in the TIR prism 315, the white light is separated into rays of three colors (G light, B light and R light) by the TIR prisms 317a through 317c. The separated rays of colors enter the DMD elements 301a through 301c corresponding to the rays of colors, and are optically modulated. Then, the rays of colors travel through the TIR prisms 317a through 317c again in a reverse direction, and colors are combined. After then, light is transmitted through the TIR prism 315, and enters the lens 10 for projection. The lens 10 for projection projects an optical image of light that has been optically modulated by the DMD elements 301a through 301c onto a screen, which is not illustrated.

FIG. 5 is a schematic diagram illustrating the structure of a projection-type display apparatus 400 according to still another embodiment of the present invention. The projection-type display apparatus 400 includes a light source 20, an illumination optical unit 30, transmission-type liquid crystal display devices 401a through 401c, as light valves corresponding to light of respective colors, dichroic mirrors 12 and 13 for color separation, a cross-dichroic prism 414 for color combination, condenser lenses 418a through 418c, total reflection mirrors 16a through 16c for deflecting optical paths, and a lens 10 for projection according to an embodiment of the present invention. In FIG. 5, the illumination optical unit 30 and the lens 10 for projection are schematically illustrated.

In the projection-type display apparatus 400, white light from the light source 20 is transmitted through the illumination optical unit 30, and separated into rays of three colors (G light, B light and R light) by the dichroic mirrors 12 and 13. The separated rays of colors enter transmission-type reflection-type liquid crystal display devices 401a through 401c corresponding to the rays of colors through the condenser lenses 418a through 418c, respectively, and are optically modulated. After colors are combined by the cross-dichroic prism 414, light enters the lens 10 for projection. The lens 10 for projection projects an optical image of light that has been optically modulated by the transmission-type liquid crystal devices 401a through 401c onto a screen, which is not illustrated.

Next, specific examples of the lens for projection of the present invention will be described.

EXAMPLE 1

FIG. 1 illustrates the lens structure of a lens for projection in Example 1. Since a main explanation of FIG. 1 has been described already, a part of the explanation will be omitted here.

The structure of the lens for projection in Example 1 will be outlined. The lens for projection in Example 1 consists of six lenses of first lens L1 in negative meniscus shape with its concave surface facing a reduction side in a paraxial region, second lens L2, which is a positive meniscus lens with its concave surface facing the reduction side, third lens L3, which is a biconcave lens, fourth lens L4, which is a biconvex lens, fifth lens L5, which is a biconvex lens, and sixth lens L6 in biconvex shape in a paraxial region. Further, the lens for projection is structured so that the reduction side is telecentric. Third lens L3 and fourth lens L4 are cemented together. Both surfaces of first lens L1 and both surfaces of sixth lens L6 are aspherical. A stop 3 is arranged between second lens L2 and third lens L3.

Table 1 and Table 2 show basic lens data and aspherical surface coefficients of Example 1, respectively, as details of the structure of the lens for projection in Example 1. A system in which a screen (not illustrated), a lens for projection and an optical member 2 are arranged in this order from she magnification side is assumed. In the basic lens data, column Si shows the surface number of the i-th surface (i=0, 1, 2, 3, . . . ) when the magnification-side surface of the most magnification-side composition element is the 0-th surface, and surface numbers are assigned to surfaces of composition elements to sequentially increase toward the reduction side. Specifically, a surface with the surface number of 0 is the screen, and a surface with the surface number of 1 is she magnification-side surface of first lens L1. Here, the basic lens data including the stop 3 are shown. In the rows of the screen and the stop 3 in the column of surface numbers, the term (SU) and the term (St) are written, respectively.

In the basic lens data, column Ri shows the curvature radius of the i-th surface. The sign of the curvature radius is positive when a surface shape is convex toward the magnification cation side, and negative when she surface shape is convex toward the reduction side. Signs R1 through R14 illustrated in FIG. 1 correspond to Ri in the basic lens data. In the basic lens data, column Di shows a distance on optical axis Z between the i-th surface and the (i+1)th surface. Column Ndj shows the refractive index of the j-th composition element (j===1, 2, 3 . . . ) for d-line (wavelength is 587.6 nm). The most magnification-side composition element is the first composition element, and the member or j sequentially increases toward the reduction side. Column vdj shows the Abbe number of the j-th composition element for d-line. Here, a numerical value in a row corresponding to D0 is a projection distance.

In the basic lens data, a mark of is attached to a surface number of an aspherical surface. The column of curvature radius shows the numerical values of paraxial curvature radii for aspherical surfaces. Table 2 shows aspherical surface coefficients of each aspherical surface. In the numerical values of the aspherical surface coefficients in Table 2, "E-n" (n: integer) means "×10$^{-n}$". The aspherical surface coefficients are values of coefficients K, Am (m=3, 4, 5, . . . 10) in an aspherical surface equation represented by the following expression:

$$Zd = C \cdot h^2 / \{1 + (1 - K \cdot C^2 \cdot h^2)^{1/2}\} \Sigma Am \cdot h, \text{ where}$$

Zd: the depth of an aspherical surface (the length of a perpendicular from a point on the aspherical surface at height h to a flat plane that contacts with the vertex of the aspherical surface and is perpendicular to the optical axis), h: a height (a length from the optical axis to the lens surface), C: a paraxial curvature, and K, Am: aspherical surface coefficients (m=3, 5, . . . 10).

Table 1 and Table 2 show normalized numerical values so that the focal length of the entire system is 1. Further, the numerical values in each table have been rounded at predetermined digits.

TABLE 1

EXAMPLE 1 BASIC LENS DATA

| Si | Ri | Di | Ndj | vdj |
|---|---|---|---|---|
| 0 (SCR) | ∞ | 145.75 | | |
| 1* | 1.253 | 0.18 | 1.4910 | 57.6 |
| 2* | 0.716 | 0.07 | | |
| 3 | 0.525 | 0.28 | 1.8052 | 25.4 |
| 4 | 0.687 | 0.11 | | |
| 5 (St) | ∞ | 0.14 | | |
| 6 | −0.389 | 0.06 | 1.7823 | 28.5 |
| 7 | 0.804 | 0.40 | 1.6230 | 58.2 |
| 8 | −0.672 | 0.02 | | |
| 9 | 1.574 | 0.34 | 1.7130 | 53.9 |
| 10 | −1.761 | 0.02 | | |
| 11* | 1.920 | 0.28 | 1.4910 | 57.6 |
| 12* | −4.446 | 0.24 | | |
| 13 | ∞ | 0.97 | 1.8467 | 23.8 |
| 14 | ∞ | | | |

TABLE 2

EXAMPLE 1 ASPHERICAL SURFACE COEFFICIENT

| SURFACE NUMBER | K | A3 | A4 | A5 | A6 |
|---|---|---|---|---|---|
| 1 | 1.0000 | 0.0000E+00 | 1.8502E+00 | −2.0882E+00 | 2.8590E+00 |
| 2 | 1.0000 | 0.0000E+00 | 1.9450E+00 | 8.0654E−01 | −2.1064E+00 |
| 11 | 1.0000 | 0.0000E+00 | 1.7529E−02 | −1.4936E−01 | 2.7926E−01 |
| 12 | 1.0000 | 0.0000E+00 | 4.1712E−01 | −5.4393E−01 | 5.8606E−01 |

| SURFACE NUMBER | A7 | A8 | A9 | A10 |
|---|---|---|---|---|
| 1 | −2.8802E−01 | −1.1612E+00 | −4.7642E−01 | 8.0022E−01 |
| 2 | 8.8958E−01 | 1.1316E+00 | −1.0483E−01 | −2.1589E+00 |
| 11 | −1.3921E−01 | −1.6673E−01 | −9.2853E−02 | 4.2572E−02 |
| 12 | 1.4733E−01 | −2.1225E−01 | −1.0196E−01 | 7.5818E−02 |

Figure 6:
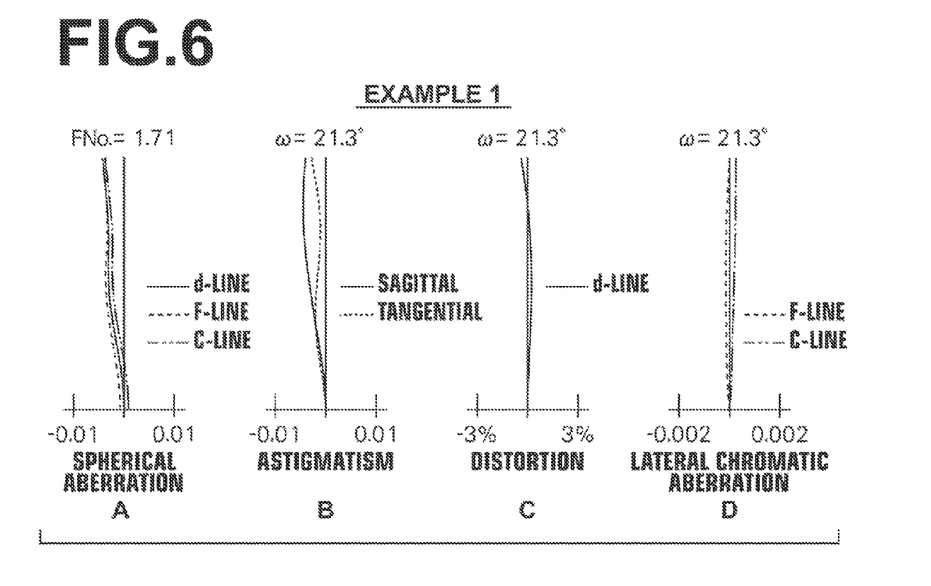
FIG. 6, Sections A through D are aberration diagrams of the lens for projection in Example 1 of the present invention.

FIG. 6, Sections A through D illustrate aberration diagrams of a spherical aberration, astigmatism, distortion, and a lateral chromatic aberration of the lens for projection in Example 1, respectively. Aberration diagrams of FIG. 6, Sections A through D illustrate aberrations based on d-line. The diagram, of the spherical aberration illustrates aberrations also for C-line (wavelength is 656.3 nm) and F-line (wavelength is 486.1 nm). The diagram of the lateral chromatic aberration illustrates aberrations for F-line and C-line. In the diagram of the astigmatism, an aberration for the sagittal direction is indicated by solid lines, and an aberration for the tangential direction is indicated by a broken line. In the diagram of the spherical aberration, the sign "FNo." means an F-number. In the other aberration diagrams, the sign "ω" means a half angle of view. The aberration diagrams in FIG. 6, Sections A through D illustrate aberrations when a projection distance is the value shown in Table 1.

The illustration method of diagrams, the signs, meanings and description methods in the tables, the feature that values are normalized so that the focal length of the entire system, is 1, and the like, as described above about Example 1, are similar also in the following examples, unless otherwise mentioned.

EXAMPLE 2

Figure 7:
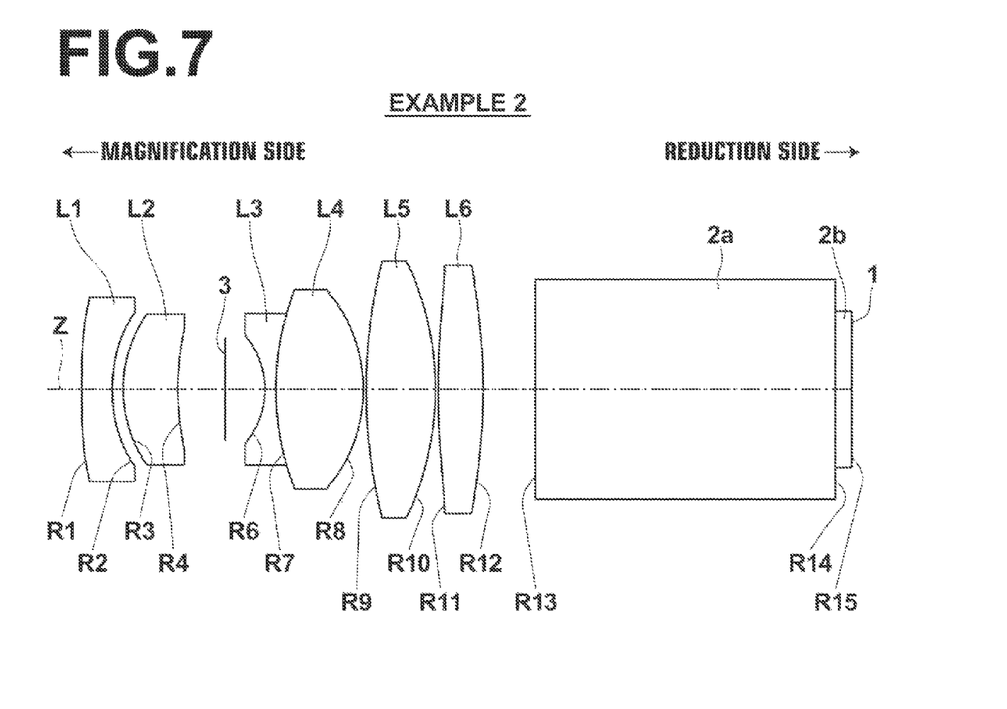
FIG. 7 is a cross section illustrating the lens structure of a lens for projection in Example 2 of the present invention.
Figure 8:
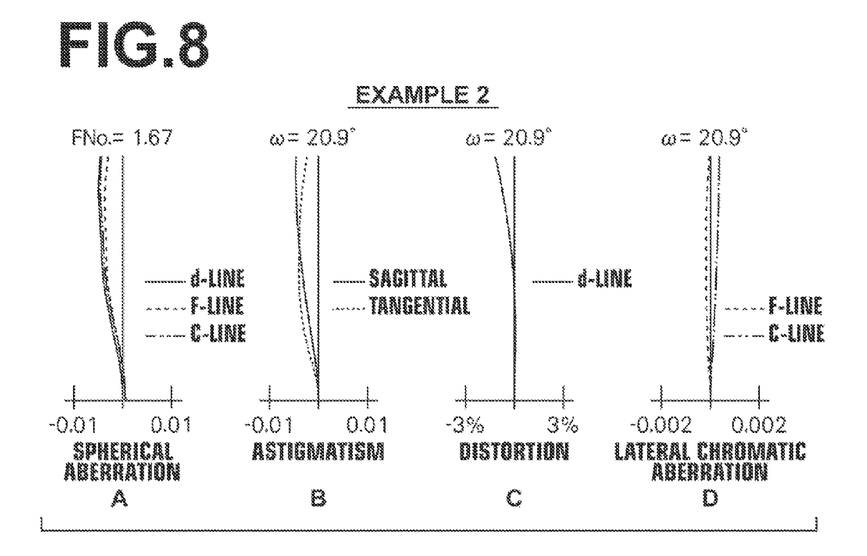
FIG. 8, Sections A through D are aberration diagrams of the lens for projection in Example 2 of the present invention.

FIG. 7 is a diagram illustrating the lens structure of a lens for projection in Example 2. The schematic structure of the lens for projection in Example 2 is similar to that of the lens for projection in Example 1. In Example 2, optical members 2a, 2b are used instead of the optical member 2 in Example 1. Table 3 and Table 4 show basic lens data and aspherical surface coefficients of the lens for projection in Example 2, respectively. FIG. 8, Sections A through D illustrate aberration diagrams of the lens for projection in Example 2.

TABLE 3

EXAMPLE 2 BASIC LENS DATA

| Si | Ri | Di | Ndj | vdj |
|---|---|---|---|---|
| 0 (SCR) | ∞ | 67.63 | | |
| 1* | 43.504 | 0.15 | 1.4910 | 57.6 |
| 2* | 0.884 | 0.05 | | |
| 3 | 0.660 | 0.27 | 1.8467 | 23.8 |
| 4 | 1.381 | 0.23 | | |
| 5 (St) | ∞ | 0.20 | | |
| 6 | −0.417 | 0.05 | 1.7847 | 26.3 |
| 7 | 1.360 | 0.43 | 1.6516 | 58.5 |
| 8 | −0.755 | 0.01 | | |
| 9 | 2.642 | 0.34 | 1.7725 | 49.6 |
| 10 | −1.496 | 0.01 | | |
| 11* | 4.054 | 0.22 | 1.4910 | 57.6 |
| 12* | −2.699 | 0.26 | | |
| 13 | ∞ | 1.49 | 1.8467 | 23.8 |
| 14 | ∞ | 0.08 | 1.5163 | 64.1 |
| 15 | ∞ | | | |

TABLE 4

EXAMPLE 2 ASPHERICAL SURFACE COEFFICIENT

| SURFACE NUMBER | K | A3 | A4 | A5 | A6 |
|---|---|---|---|---|---|
| 1 | 1.0000 | 0.0000E+00 | 2.3142E+00 | −4.3386E+00 | 2.7167E+00 |
| 2 | 1.0000 | 0.0000E+00 | 2.1512E+00 | −1.7147E+00 | −3.0047E+00 |
| 11 | 1.0000 | 0.0000E+00 | 4.9560E−02 | −3.6276E−01 | 3.5599E−01 |
| 12 | 1.0000 | 0.0000E+00 | 2.8145E−01 | −5.6175E−01 | 5.0825E−01 |

| SURFACE NUMBER | A7 | A8 | A9 | A10 |
|---|---|---|---|---|
| 1 | −3.5988E−02 | −1.1532E+00 | −4.7941E−01 | 1.0746E+00 |
| 2 | 7.0391E−01 | 1.1936E+00 | −2.0729E−01 | −2.8116E+00 |
| 11 | −1.1875E−01 | −1.8080E−01 | −1.0866E−01 | 5.6967E−02 |
| 12 | 7.4405E−02 | −2.9603E−01 | −1.3837E−01 | 9.5710E−02 |

Figure 9:
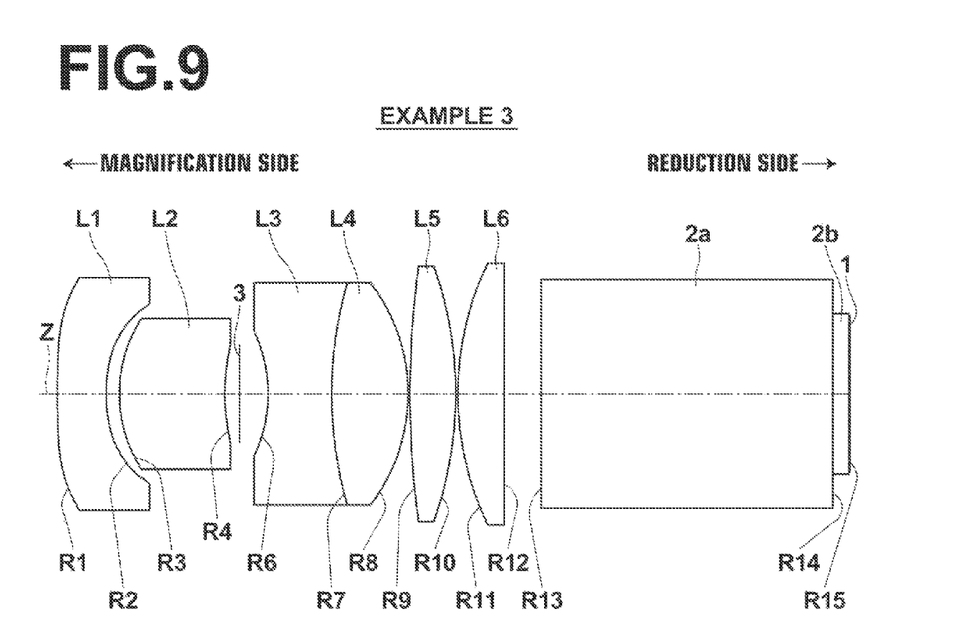
FIG. 9 is a cross section illustrating the lens structure of a lens for projection in Example 3 of the present invention.
Figure 10:
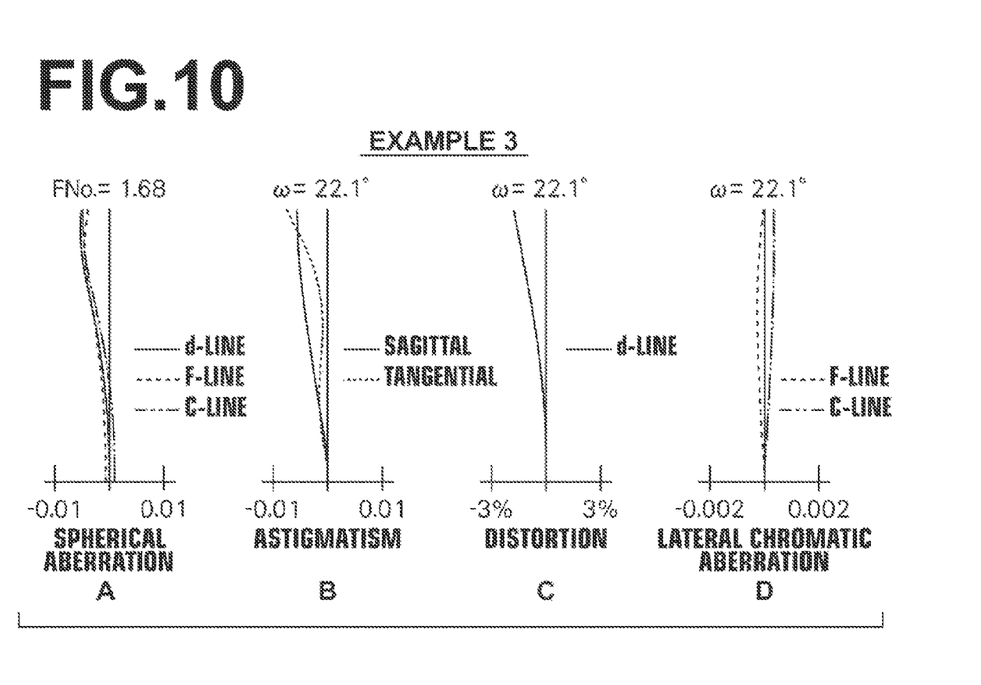
FIG. 10, Sections A through D are aberration diagrams of the lens for projection in Example 3 of the present invention.

FIG. 9 is a diagram illustrating the lens structure of a lens for projection in Example 3. The schematic structure of the lens for projection in Example 3 is similar to that of the lens for projection in Example 2. However, Example 3 differs from Example 2 in that first lens L1 has a biconcave shape in a paraxial region, and that sixth-lens L6 is a plano-convex lens with its flat surface facing the reduction side, and that six-th lens L6 includes no aspherical surface. Table 5 and Table 6 show basic lens data and aspherical surface coefficients of the lens for projection in Example 3, respectively. FIG. 10, Sections A through D illustrate aberration diagrams of the lens for projection in Example 3.

TABLE 5

EXAMPLE 3 BASIC LENS DATA

| Si | Ri | Di | Ndj | vdj |
|---|---|---|---|---|
| 0 (SCR) | ∞ | 67.63 | | |
| 1* | −59.684 | 0.25 | 1.4910 | 57.6 |
| 2* | 0.899 | 0.07 | | |
| 3 | 0.713 | 0.54 | 1.8467 | 23.8 |
| 4 | 1.084 | 0.08 | | |
| 5 (St) | ∞ | 0.14 | | |
| 6 | −0.754 | 0.32 | 1.8467 | 23.8 |
| 7 | 2.068 | 0.39 | 1.7440 | 44.8 |
| 8 | −0.943 | 0.01 | | |
| 9 | 4.951 | 0.23 | 1.6230 | 58.2 |
| 10 | −1.959 | 0.01 | | |
| 11 | 1.546 | 0.24 | 1.6230 | 58.2 |
| 12 | ∞ | 0.19 | | |
| 13 | ∞ | 1.49 | 1.8467 | 23.8 |
| 14 | ∞ | 0.08 | 1.5163 | 64.1 |
| 15 | ∞ | | | |

TABLE 6

EXAMPLE 3 ASPHERICAL SURFACE COEFFICIENT

| SURFACE NUMBER | K | A3 | A4 | A5 | A6 |
|---|---|---|---|---|---|
| 1 | 1.0000 | 0.0000E+00 | 1.9940E+00 | −2.7765E+00 | 1.7066E+00 |
| 2 | 1.0000 | 0.0000E+00 | 2.5530E+00 | −2.3843E+00 | 1.5331E+00 |

| SURFACE NUMBER | A7 | A8 | A9 | A10 |
|---|---|---|---|---|
| 1 | 2.4640E−01 | −8.7277E−01 | −3.6867E−01 | 1.1078E+00 |
| 2 | 3.0269E+00 | 2.0982E+00 | 1.1223E−01 | −2.7085E+00 |

Table 7 shows values corresponding to conditional formulas (1) through (7) in Examples 1 through 3. Table 7 shows values for d-line.

TABLE 7

| CONDITIONAL FORMULA | (1) $1/(P4 \times f)$ | (2) $1/(P5 \times f)$ | (3) Bf/f | (4) D/f | (5) R3/R4 | (6) f2/f | (7) $\nu$ d2 |
|---|---|---|---|---|---|---|---|
| EXAMPLE 1 | −0.9 | −0.5 | 0.8 | 1.9 | 0.8 | 1.6 | 25.4 |
| EXAMPLE 2 | −1.6 | −0.5 | 1.1 | 2.0 | 0.5 | 1.3 | 23.8 |
| EXAMPLE 3 | −1.3 | −0.9 | 1.1 | 2.3 | 0.7 | 1.5 | 23.8 |

So far, the present invention has been described by using embodiments and examples. However, the present invention is not limited to the aforementioned embodiments nor examples, and various modifications are possible. For example, the curvature radius, a surface distance, a refractive index, an Abbe number and aspherical surface coefficients of each lens are not limited to the values in the numerical value example but may be other values.

Further, the structure of the projection-type display apparatus of the present invention is not limited to the aforementioned structure. For example, a light valve or light valves to be used and optical members to be used to separate rays or combine rays are not limited to the aforementioned structure, and various modifications of the mode are possible.

What is claimed is:

1. A lens for projection consisting of six lenses of:
    a first lens having negative refractive power with a concave surface facing a reduction side;
    a second lens having positive refractive power with a concave surface facing the reduction side;
    a third lens having negative refractive power with a concave surface facing a magnification side;
    a fourth lens having positive refractive power with a convex surface facing the reduction side;
    a fifth lens having positive refractive power; and
    a sixth lens having positive refractive power, in this order from the magnification side,
    wherein the following conditional formulas (1) and (2) are satisfied:

$$-3.0 \leq 1/(P4xf) \leq -0.4 \quad (1); \text{ and}$$

$$-2.0 \leq 1/(P5xf) \leq -0.2 \quad (2), \text{ where}$$

P4: refractive power of a reduction-side surface of the second lens,
P5: refractive power of a magnification-side surface of the third lens, and
f: a focal length of an entire system,
wherein the following conditional formula (3') is satisfied:

$$0.5 \leq Bf/f \leq 1.5 \quad (3'), \text{ where}$$

Bf: a back focus of the entire system (a distance in air).

2. The lens for projection, as defined in claim 1, wherein the following conditional formula (1') is satisfied:

$$-2.5 \leq 1/(P4xf) \leq -0.6 \quad (1').$$

3. The lens for projection, as defined in claim 1, wherein the following conditional formula (2') is satisfied:

$$-1.5 \leq 1/(P5xf) \leq -0.3 \quad (2').$$

4. The lens for projection, as defined in claim 1, wherein the following conditional formula (4) is satisfied:

$$1.0 \leq D/f \leq 3.5 \quad (4), \text{ where}$$

D: a distance on an optical axis from a magnification-side lens surface of the first lens to a reduction-side lens surface of the sixth lens.

5. The lens for projection, as defined in claim 4, wherein the following conditional formula (4') is satisfied:

$$1.5 \leq D/f \leq 3.0 \quad (4').$$

6. The lens for projection, as defined in claim 1, wherein the following conditional formula (5) is satisfied:

$$0.2 \leq R3/R4 \leq 0.9 \quad (5), \text{ where}$$

R3: a curvature radius of a magnification-side surface of the second lens, and
R4: a curvature radius of a reduction-side surface of the second lens.

7. The lens for projection, as defined in claim 6, wherein the following conditional formula (5') is satisfied:

$$0.3 \leq R3/R4 \leq 0.9 \quad (5').$$

8. The lens for projection, as defined in claim 1, wherein at least one of lens surfaces included in the first lens and the sixth lens is aspherical.

9. A projection-type display apparatus comprising:
    a light source;
    a light valve on which light from the light source is incident; and the lens for projection, as defined in claim 1, as a lens for projection that projects an optical image of light that has been optically modulated by the light valve onto a screen.

10. The lens for projection, as defined in claim 1, wherein the third lens and the fourth lens are cemented together.

11. A lens for projection consisting of six lenses of:
a first lens having negative refractive power with a concave surface facing a reduction side;
a second lens having positive refractive power with a concave surface facing the reduction side;
a third lens having negative refractive power with a concave surface facing a magnification side;
a fourth lens having positive refractive power with a convex surface facing the reduction side;
a fifth lens having positive refractive power; and
a sixth lens having positive refractive power, in this order from the magnification side,
wherein the reduction side is telecentric, and
wherein the following conditional formulas (1) and (2) are satisfied:

$$-3.0 \leq 1/(P4xf) \leq -0.4 \quad (1); \text{and}$$

$$-2.0 \leq 1/(P5xf) \leq -0.2 \quad (2), \text{where}$$

P4: refractive power of a reduction-side surface of the second lens,
P5: refractive power of a magnification-side surface of the third lens, and
f: a focal length of an entire system,
wherein the following conditional formula (6) is satisfied:

$$1.0 \leq f2/f \leq 2.0, \text{where}$$

f2: a focal length of the second lens.

12. A projection-type display apparatus comprising:
a light source;
a light valve on which light from the light source is incident; and
the lens for projection, as defined in claim 11, as a lens for projection that projects an optical image of light that has been optically modulated by the light valve onto a screen.

13. A lens for projection consisting of six lenses of:
a first lens having negative refractive power with a concave surface facing a reduction side;
a second lens having positive refractive power with a concave surface facing the reduction side;
a third lens having negative refractive power with a concave surface facing a magnification side;
a fourth lens having positive refractive power with a convex surface facing the reduction side;
a fifth lens having positive refractive power; and
a sixth lens having positive refractive power, in this order from the magnification side,
wherein the reduction side is telecentric, and
wherein the following conditional formulas (1) and (2) are satisfied:

$$-3.0 \leq 1/(P4xf) -0.4 \quad (1); \text{and}$$

$$-2.0 \leq 1/(P5xf) \leq -0.2 \quad (2), \text{where}$$

P4: refractive power of a reduction-side surface of the second lens,
P5: refractive power of a magnification-side surface of the third lens, and
f: a focal length of an entire system,
wherein the third lens and the fourth lens are cemented together in contact with each other with abutting lens surfaces and the radii of curvature of the abutting lens surfaces are identical.

14. The lens for projection, as defined in claim 13, wherein the following conditional formula (3) is satisfied:

$$0.5 \leq Bf/f \leq 2.0 \quad (3), \text{where}$$

Bf: a back focus of the entire system (a distance in air).

15. The lens for projection, as defined in claim 14, wherein the following conditional formula (4') is satisfied:

$$1.5 \leq D/f \leq 3.0 \quad (4').$$

16. The lens for projection, as defined in claim 13, wherein the following conditional formula (4) is satisfied:

$$1.0 \leq D/f \leq 3.5 \quad (4), \text{where}$$

D: a distance on an optical axis from a magnification-side lens surface of the first lens to a reduction-side lens surface of the sixth lens.

17. A projection-type display apparatus comprising:
a light source;
a light valve on which light from the light source is incident; and
for projection, as defined in claim 13, as a lens for projection that projects an optical image of light that has been optically modulated by the light valve onto a screen.

18. A lens for projection consisting of six lenses of:
a first lens having negative refractive power with a concave surface facing a reduction side;
a second lens having positive refractive power with a concave surface facing the reduction side;
a third lens having negative refractive power with a concave surface facing a magnification side;
a fourth lens having positive refractive power with a convex surface facing the reduction side;
a fifth lens having positive refractive power; and
a sixth lens having positive refractive power, in this order from the magnification side,
wherein the reduction side is telecentric, and
wherein the following conditional formulas (1) and (2) are satisfied:

$$-3.0 \leq 1/(P4xf) \leq -0.4 \quad (1); \text{and}$$

$$-2.0 \leq 1/(P5xf) -0.2 \quad (2), \text{where}$$

P4: refractive power of a reduction-side surface of the second lens,
P5: refractive power of a magnification-side surface of the third lens, and
f: a focal length of an entire system,
wherein the following conditional formula (7) is satisfied:

$$vd2 \leq 25.4 \quad (7), \text{where}$$

vd2: an Abbe number of the second lens for d-line.

19. A projection-type display apparatus comprising:
a light source;
a light valve on which light from the light source is incident; and
the lens for projection, as defined in claim 18, as a lens for projection that projects an optical image of light that has been optically modulated by the light valve onto a screen.

* * * * *